United States Patent
Chiesi

(10) Patent No.: US 11,639,875 B2
(45) Date of Patent: May 2, 2023

(54) METHOD FOR PROCESSING A RAW IMAGE COLLECTED BY A BOLOMETER DETECTOR AND ASSOCIATED DEVICE

(71) Applicant: Schneider Electric Industries SAS, Rueil-Malmaison (FR)

(72) Inventor: Laurent Chiesi, Voiron (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 17/347,631

(22) Filed: Jun. 15, 2021

(65) Prior Publication Data

US 2021/0396588 A1 Dec. 23, 2021

(30) Foreign Application Priority Data

Jun. 23, 2020 (FR) ..................................... 2006538

(51) Int. Cl.
*G01J 5/22* (2006.01)
*G01J 5/06* (2022.01)
(Continued)

(52) U.S. Cl.
CPC . *G01J 5/22* (2013.01); *G01J 5/06* (2013.01); *G01J 5/064* (2022.01); *G01J 5/80* (2022.01);
(Continued)

(58) Field of Classification Search
CPC ...... G01J 5/22; G01J 5/06; G01J 5/064; G01J 5/80; G01J 2005/0077; G01J 2005/202; G01J 5/20; G01J 5/00; G06T 5/007
See application file for complete search history.

(56) References Cited

U.S. PATENT DOCUMENTS

| | | |
|---|---|---|
| 2010/0237245 A1 | 9/2010 | King et al. |
| 2020/0018652 A1 | 1/2020 | Chiesi |

FOREIGN PATENT DOCUMENTS

| | | |
|---|---|---|
| EP | 2940991 A1 | 11/2015 |
| EP | 3594643 A1 | 1/2020 |

OTHER PUBLICATIONS

French Search Report and Written Opinion dated Apr. 4, 2021 for French Patent Application No. FR2006538, 10 pages.

*Primary Examiner* — David P Porta
*Assistant Examiner* — Gisselle M Gutierrez
(74) *Attorney, Agent, or Firm* — Locke Lord LLP

(57) ABSTRACT

A method for processing a raw image characterized by first $Pix_1(i,j)$ and second $Pix_2(i,j)$ raw measurements collected by first $Bol_1(i,j)$ and second $Bol_2(i,j)$ bolometers of a set of bolometers $Bol(i,j)$ of a detector, the first bolometers $Bol_1(i,j)$ being closed off, the method being executed by a computer on the basis of reference measurements $Pix_{REF}(i,j)$ that include first $Pix_{1REF}(i,j)$ and second $Pix_{2REF}(i,j)$ reference measurements associated with the first $Bol_1(i,j)$ and with the second $Bol_2(i,j)$ bolometers, the method including:

a) a correlation step between the first raw measurements $Pix_1(i,j)$ and the first reference measurements $Pix_{1REF}(i,j)$; and b) a step of correcting the raw image, which includes computing corrected measurements $Pix_{Cor}(i,j)$ of a corrected image for each bolometer $Bol(i,j)$ on the basis of the reference measurements $Pix_{REF}(i,j)$ and of the result of step a).

9 Claims, 3 Drawing Sheets

(51) Int. Cl.
*G01J 5/80* (2022.01)
*G01J 5/00* (2022.01)
*G01J 5/20* (2006.01)
(52) U.S. Cl.
CPC . *G01J 2005/0077* (2013.01); *G01J 2005/202* (2013.01)

METHOD FOR PROCESSING A RAW IMAGE COLLECTED BY A BOLOMETER DETECTOR AND ASSOCIATED DEVICE

TECHNICAL FIELD

The present invention relates to a method for processing a raw image collected by a detector provided with a matrix-array of bolometers. The processing method according to the present invention is in particular intended to correct non-uniformities caused by dispersions in the features of the bolometers of the detector.

The present invention also relates to a computer program able to implement all of the steps of the method according to the present invention.

The invention relates lastly to a detector comprising bolometers and to a computer implementing the computer program.

PRIOR ART

An infrared detector (or imager) known from the prior art generally comprises bolometers that are organized in the form of a matrix-array of n rows and m columns.

When they are exposed to a scene in order to acquire an image, these bolometers, which are sensitive to the temperature of the scene, experience a change in their electrical resistance. In other words, the current flowing in each of the bolometers is dependent on the temperature of the scene, but also on the ambient temperature. In particular, the measurement $S_p(i,j)$ of the bolometers $Bol(i,j)$ of a matrix-array of bolometers evolves in accordance with the following law:

$$S_p(i,j) = R_{esp}(T_{scene} - T_{amb}) + S_{0,T_{amb}} \quad \text{[Math 1]}$$

Where:
- $T_{amb}$ is the ambient temperature, also associated with the temperature of the imager;
- $T_{scene}$ is the temperature of the scene seen by the bolometer i, j;
- $R_{esp}$ is the responsiveness of the bolometer;
- $S_{0,T_{amb}}$ is the output value of the bolometer for a scene temperature equal to the temperature of the imager.

The term $R_{esp}$ reflects the capability of a bolometer to convert an incoming signal (in particular radiation) into an electrical signal, and more particularly an electric current. This term $R_{esp}$, which depends on the materials that are used to design the bolometer and on the architecture thereof, is closely linked to its electrical resistivity. The latter varies as a function of the ambient temperature and also of the difference between this ambient temperature and the scene temperature. Deducing the scene temperature requires knowing the temperature of the imager $T_{amb}$, and so the detector is generally also provided with a temperature sensor.

In practice, such a detector is also provided with additional bolometers, called blind bolometers, that are not exposed to the scene. Their electrical resistivity, and therefore the current flowing through them, depends only on the ambient temperature $T_{amb}$.

A differential measurement of the currents flowing through a blind bolometer and a bolometer of the matrix-array of bolometers thus makes it possible to deduce the variation in the electrical resistivity thereof.

In general, each column of the matrix-array of bolometers is associated with a blind bolometer that is implemented for each of the bolometers of said column during the differential measurement. Other configurations may however be contemplated, in particular pooling a single blind bolometer for multiple columns of bolometers.

The raw image (FIG. 1) of a scene able to be obtained with such a device is generally not able to be used, and requires additional processing.

In particular, the image illustrated in FIG. 1 shows the positioning of the bolometers of the detector, and more particularly a non-uniformity ("pixelation effect"). This effect originates from the significant dispersion in electrical resistances from one bolometer to another.

The image also has a column-like appearance that is caused by the dispersion in electrical resistances between the blind bolometers.

Various solutions have been contemplated to overcome these problems.

It has been proposed in particular to implement a mechanical shutter on the detector. The mechanical shutter is in particular placed in front of the detector so as to collect a reference image relative to the ambient temperature, which is then subtracted from the image of the scene.

This layout, which is relatively simple in terms of its principle, is however not satisfactory. Specifically, implementing a shutter and the motorization means associated therewith pose problems in terms of both cost and bulk.

Moreover, the reference image has to be refreshed as soon as the ambient temperature varies.

Alternatively, it has been proposed to characterize the response at a reference temperature, in particular the temperature of the detector, and in particular of each of its bolometers.

This characterization comprises reference measurement at various temperatures with all of the bolometers of the detector closed off with a shutter.

The reference measurements then make it possible to determine the temperature evolution of each of the bolometers, and thus to construct calibration tables that are kept in a memory space of the detector.

Thus, during operation, the detector corrects the raw image by subtracting, for each bolometer, values obtained through interpolation on the basis of the calibration tables.

This solution, which makes it possible to reduce the effect of non-uniformity of the image from one bolometer to another, is however not satisfactory.

Specifically, the procedure of acquiring the reference measurements is lengthy and generates an extra production cost for the detector.

Moreover, the memory space dedicated to saving the calibration tables is undesirable due to the cost associated therewith.

A third method based on algorithms that make it possible to correct the non-uniformity of the image has been proposed in documents [1] and [2] cited at the end of the description.

These methods known from the prior art are not satisfactory either.

Specifically, these methods are generally tedious to implement, and their robustness is questionable.

Moreover, these methods require implementing cumbersome computing means that are of further detriment to the cost of the detectors in which they are implemented.

Lastly, a fourth method for correcting raw measurements collected by bolometers via a reference matrix-array determination has been proposed in document [3] cited at the end of the description. This method is relatively robust for correcting the pixelation effect and the column-like appearance liable to be observed in a raw image.

However, these two aspects are corrected by way of two separate procedures, such that this fourth method would benefit from being simplified.

One aim of the present invention is to propose a method for processing an image collected by a detector provided with bolometers, which method is easier to implement and does not require the attachment of mechanical parts and the robotics associated therewith.

Another aim of the invention is to propose a method that makes it possible to correct the column effect observed in a raw image.

SUMMARY OF THE INVENTION

The aims of the invention are achieved at least in part by way of a method for processing a raw image characterized by raw measurements $\text{Pix}(i,j)$ that comprise first $\text{Pix}_1(i,j)$ and second $\text{Pix}_2(i,j)$ raw measurements collected, respectively, by first $\text{Bol}_1(i,j)$ and second $\text{Bol}_2(i,j)$ bolometers of a set of bolometers $\text{Bol}(i,j)$ of a detector that are arranged in the form of a matrix-array of n rows ($L_i$) and m columns ($C_j$), the first bolometers $\text{Bol}_1(i,j)$ being closed off during the acquisition of the raw measurements $\text{Pix}(i,j)$, the method being executed by a computer on the basis of reference measurements $\text{Pix}_{REF}(i,j)$ that comprise first $\text{Pix}_{1REF}(i,j)$ and second $\text{Pix}_{2REF}(i,j)$ reference measurements associated, respectively, with the first $\text{Bol}_1(i,j)$ and with the second $\text{Bol}_2(i,j)$ bolometers, the method comprising:

a) a correlation step, for each first bolometer $\text{Bol}_1(i,j)$, between the first raw measurements $\text{Pix}_1(i,j)$ and the first reference measurements $\text{Pix}_{1REF}(i,j)$;

b) a step of correcting the raw image, which comprises computing corrected measurements $\text{Pix}_{Cor}(i,j)$ of a corrected image for at least each second bolometer $\text{Bol}(i,j)$ on the basis of the reference measurements $\text{Pix}_{REF}(i,j)$ and of the result of correlation step a).

According to one mode of implementation, correlation step a) comprises a linear regression, such that the first raw measurements $\text{Pix}_1(i,j)$ and the first reference measurements $\text{Pix}_{1REF}(i,j)$ satisfy the following relationship:

$$\text{Pix}_1(i,j) = \alpha \cdot \text{Pix}_{1REF}(i,j) + \text{Pix}_{offset} \quad \text{[Math 2]}$$

where $\alpha$ and $\text{Pix}_{offset}$ are the terms determined during the linear regression. According to one mode of implementation, correction step b) comprises computing the corrected measurements $\text{Pix}_{Cor}(i,j)$ for at least each second bolometer $\text{Bol}(i,j)$ in accordance with the following relationship:

$$\text{Pix}_{Cor}(i,j) = \text{Pix}(i,j) - \alpha \cdot \text{Pix}_{REF}(i,j) - \text{Pix}_{offset} \quad \text{[Math 3]}$$

According to one mode of implementation, the reference measurements $\text{Pix}_{REF}(i,j)$ are saved in a memory space of the detector.

According to one mode of implementation, the detector is provided with a lens mounted on a diaphragm that closes off the first bolometers $\text{Bol}_1(i,j)$ at the corners of the detector.

According to one mode of implementation, the reference measurements $\text{Pix}_{REF}(i,j)$ are obtained, during a step of calibrating the detector, by using a shutter to mask all of the bolometers, the shutter being kept at a temperature identical to that of the detector. According to one mode of implementation, the reference measurements $\text{Pix}_{REF}(i,j)$ are average measurements of the signal actually collected by the bolometers during the calibration step.

According to one mode of implementation, the detector also comprises blind bolometers $\text{Bol}_{blind}(j)$, each blind bolometer $\text{Bol}_{blind}(i,j)$ being implemented for the differential measurement of the bolometers of at least one column of bolometers $\text{Bol}(i,j)$ that is specific thereto; each blind bolometer $\text{Bol}_{blind}(i,j)$ is advantageously associated with a single column ($C_j$) of bolometers ($\text{Bol}(i,j)$).

The invention also relates to a computer program that, when it is executed by a computer, leads to the method according to the invention being implemented.

The invention also relates to a device comprising:
a detector provided with bolometers $\text{Bol}(i,j)$ arranged in the form of a matrix-array of n rows ($L_i$) and m columns ($C_j$), the bolometers comprising first $\text{Bol}_1(i,j)$ and second $\text{Bol}_2(i,j)$ bolometers, the first bolometers $\text{Bol}_1(i,j)$ being closed off;
a computer provided with the computer program according to the invention.

BRIEF DESCRIPTION OF THE DRAWINGS

Other features and advantages will become apparent in the following description of a method for processing an image, given by way of non-limiting example and with reference to the appended drawings, in which.

DETAILED DESCRIPTION OF PARTICULAR EMBODIMENTS

The present invention will now be described with reference to FIGS. 1 to 4b.

Figure 2:
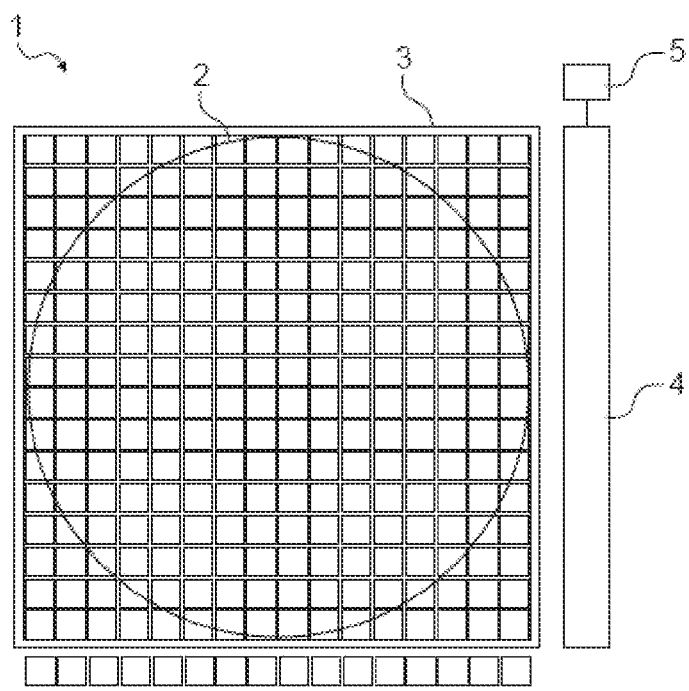
FIG. 2 is a schematic depiction of a detector provided with a lens mounted on a diaphragm able to be implemented according to the present invention.

FIG. 2 shows a detector 1 provided with a plurality of bolometers, denoted $\text{Bol}(i,j)$, arranged in the form of a matrix-array of n rows (denoted "$L_i$") and m columns (denoted "$C_j$").

A bolometer indexed i, j corresponds to a bolometer arranged at the intersection of the row i with the column j.

Among the bolometers $\text{Bol}(i,j)$, it is possible to distinguish between first bolometers $\text{Bol}_1(i,j)$ and second bolometers $\text{Bol}_2(i,j)$.

In particular, the bolometers $\text{Bol}(i,j)$ are arranged such that the first bolometers $\text{Bol}_1(i,j)$ are closed off while the second bolometers $\text{Bol}_2(i,j)$ are exposed to a scene intended to be imaged.

In other words, only the second bolometers $\text{Bol}_2(i,j)$ are sensitive to the (thermal) radiation from the scene intended to be imaged, while the first bolometers $\text{Bol}_1(i,j)$ do not receive or perceive any radiation from said scene.

Therefore, the definition of a first bolometer $\text{Bol}_1(i,j)$, in accordance with the terms of the present invention, may involve selecting said first bolometers $\text{Bol}_1(i,j)$ from among all of the bolometers $\text{Bol}(i,j)$ of the detector 1. In this respect, this selection may be based on considerations in relation to the effectiveness of the closing off of said first bolometers $\text{Bol}_1(i,j)$.

It is also understood that the closing off of the first bolometers Bol$_1$(i,j) is permanent, and that this may be achieved via a specific fixed element (for example a diaphragm as described in the remainder of the description) forming an integral part of the detector. "Fixed element" is understood to mean that said element is not mobile and not motorized.

The first bolometers Bol$_1$(i,j) may for example be closed off by a diaphragm on which there is mounted a lens 2 that is arranged between the scene and the detector 1. The first raw bolometers Bol$_1$(i,j) are arranged in the corners of the detector in this configuration. The invention is however not limited to this layout, and the first bolometers Bol$_1$(i,j) may for example form complete columns of bolometers, in particular the columns bordering the matrix-array of bolometers.

It is also understood that a first bolometer Bol$_1$(i,j), since it is masked, is sensitive only to the radiation associated with the diaphragm that closes it off during the acquisition of data, this diaphragm advantageously being at the same temperature as the detector 1. The detector in FIG. 2 may also comprise a plurality of blind bolometers Bol$_{BLIND}$(j).

The detector 1 furthermore comprises a computer 4 provided with a computing processor intended to execute the various steps of the method according to the present invention. The computer may also comprise a memory space for saving the raw measurements, reference measurements or intermediate measurements.

Lastly, the detector 1 may comprise a temperature probe 5 intended to evaluate a reference temperature, in particular the temperature of the detector, denoted T$_{amb}$. The temperature probe may for example comprise a PN junction.

The method according to the present invention proposes to correct the defects in a raw image collected by the detector 1. The raw image is characterized in particular by a set of raw measurements Pix(i,j) representative of the temperature T$_{scene}$ of the scene observed by each bolometer i, j. These raw measurements Pix(i,j) are derived from a signal S$_p$(i,j) actually delivered by each bolometer and representative of the observed scene via the equation:

$$S_p(i,j) = R_{esp(i,j)}(T_{scene} - T_{amb}) + S_{0,T_{amb}} \quad [\text{Math 4}]$$

Where:
T$_{amb}$ is the temperature of the imager;
T$_{scene}$ is the temperature of the scene seen by the bolometer i, j;
R$_{esp(i,j)}$ is the responsiveness of the bolometer;
S$_{0,Tamb}$ is the output value of the bolometer for a scene temperature equal to the ambient temperature.

It is understood that the temperature T$_{amb}$ is the temperature of each of the bolometers of the imager, and that this is the same as the ambient temperature in the case of thermal equilibrium with the surroundings in which the imager is located.

The responsiveness R$_{esp(i,j)}$ of each of the bolometers Bol(i,j) may be determined during production of the detector or before it is first used. In particular, determining the responsiveness Bol(i,j) may involve a first and a second calibration measurement. The first calibration measurement may in particular comprise exposing the detector, and more particularly all of the bolometers, to an object or black body kept at a first temperature that is advantageously equal to that of said bolometers and is denoted T$_{amb}$ below. The second calibration measurement may comprise exposing the detector a second time to another black body kept at a second temperature that is different from, for example higher than, the first temperature. Simply knowing the reference temperature, in particular the temperature of the detector, as well as the first and second temperatures makes it possible to deduce the responsiveness R$_{esp(i,j)}$ of each of the bolometers Bol(i,j). The responsivenesses R$_{esp(i,j)}$ are in particular saved in the memory space of the computer 4.

This calibration procedure remains easy to execute, and does not require implementing algorithms that consume a large amount of memory space and significant computing resources.

Figure 1:
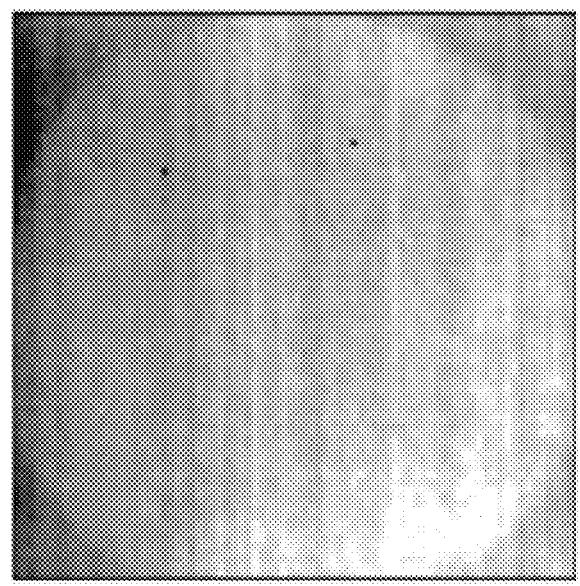
FIG. 1 is a raw image of a scene obtained by a detector provided with bolometers arranged in a matrix-array of 80 rows by 80 columns.

FIG. 1 shows one example of an image formed from raw measurements Pix(i,j). This FIG. 1, discussed in the "PRIOR ART" section, exhibits uniformity defects and a column-like appearance.

The non-uniformity is essentially caused by a dispersion in the electrical resistances of the bolometers forming the detector.

Darker regions may also be observed in the corners of the image. These correspond to the raw measurements Pix(i,j), called first raw measurements Pix$_1$(i,j), collected by the first bolometers Bol$_1$(i,j). These dark regions result from the first bolometers Bol$_1$(i,j) being closed off by the diaphragm on which the lens is mounted, and will be utilized to correct the defects actually observed in the raw image.

A brighter central region, corresponding to the raw measurements Pix(i,j), called second raw measurements Pix$_2$(i,j), of the second bolometers Bol$_2$(i,j) may also be seen.

Finally, FIG. 1 also exhibits a column-like appearance, which is caused by the dispersion in the electrical resistances of the blind bolometers Bol$_{BLIND}$(j). In this respect, each blind bolometer Bol$_{BLIND}$(j) is implemented for the differential measurement of the bolometers of at least one column of bolometers that is specific thereto; each blind bolometer Bol$_{BLIND}$(j) is advantageously associated with a single column C$_j$ of bolometers Bol(i,j).

It should be noted that, if all of the columns were to be associated with the same blind bolometer, the column effect would not be observed. However, this configuration is undesirable since any defect with this single blind bolometer would render the whole detector inoperative.

The method according to the present invention comprises a correlation step a) between the first raw measurements Pix$_1$(i,j) and first reference measurements Pix$_{1REF}$(i,j). The first reference measurements Pix$_{1REF}$(i,j) are in particular measurements collected by each of the first bolometers Bol$_1$(i,j) by applying a mask or a shutter, covering the whole of the detector 1 (and therefore all of the first and second bolometers), and kept at a reference temperature, for example the same temperature as said detector 1, such as 20° C.

The mask or the shutter should not be confused with the abovementioned diaphragm. Specifically, the mask is a part that is placed in front of the detector (the bolometers) for calibration purposes or in order to determine technical features of the bolometers during production thereof. No consideration whatsoever is given to this mask when using the detector.

It is understood that, when acquiring first reference measurements Pix$_{1REF}$(i,j), second reference measurements Pix$_{2REF}$(i,j) are also acquired by the second bolometers Pix$_{2REF}$(i,j). These second reference measurements Pix$_{2REF}$(i,j), like the first reference measurements Pix$_{1REF}$(i,j), correspond to the image of a scene kept at a reference temperature, for example at the same temperature as the detector. These second reference measurements Pix$_{2REF}$(i,j) are in particular used during step b) according to the invention described above.

The first reference measurements $Pix_{1REF}(i,j)$ and the second reference measurements $Pix_{2REF}(i,j)$ may be saved in the memory space of the computer 4. These reference measurements may be acquired in the course of a calibration procedure and advantageously be acquired at the same time as the first calibration measurement described above.

Correlation step a) according to the present invention may involve a linear regression. In particular, correlation step a) may involve determining coefficients α and $Pix_{offset}$ through linear regression, in particular based on first reference measurements $Pix_{1REF}(i,j)$, such that:

$$Pix_1(i,j) = \alpha \cdot Pix_{1REF}(i,j) + Pix_{offset} \quad \text{[Math 5]}$$

Figure 3:
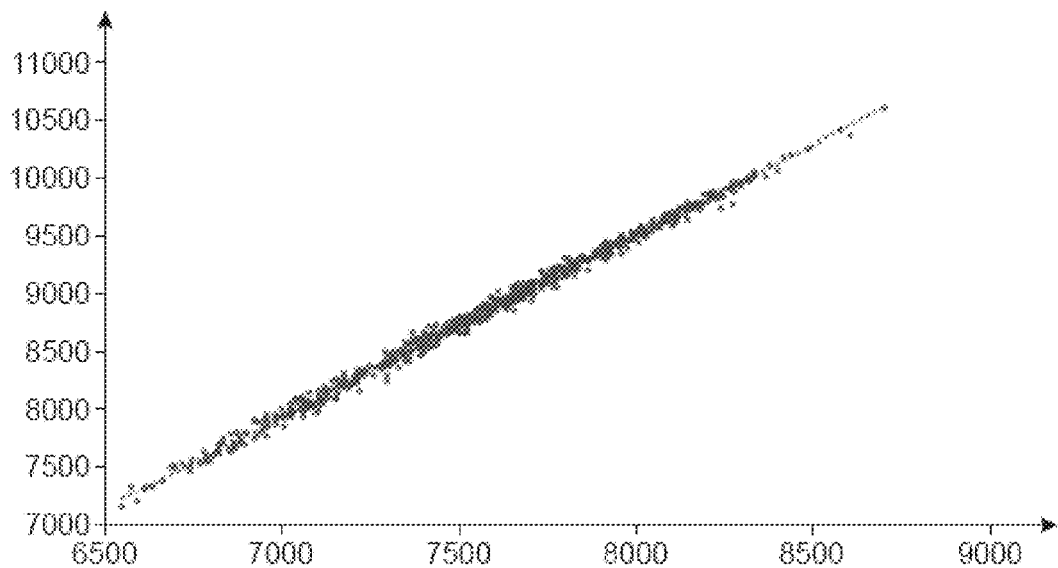
FIG. 3 is a graph-based depiction of the first raw measurements $\text{Pix}_1(i,j)$ (on the vertical axis) as a function of the first reference measurements $\text{Pix}_{1REF}(i,j)$ (horizontal axis)

FIG. 3 shows a graph of the first raw measurements $Pix_1(i,j)$ (vertical axis) as a function of the first reference measurements $Pix_{1REF}(i,j)$ (horizontal axis). A linear trend is clearly observed, thus making it possible to justify the choice of a correlation by way of a linear regression.

This aspect is unexpected since no technical element makes it possible to foresee such behaviour. On the contrary, a more erratic trend was expected, given the plurality of technical parameters defining the operation of a bolometer.

The correlation through linear regression is obtained in particular without any prior correction or calibration of the column-like appearance of the first reference measurements $Pix_1(i,j)$, thereby still making it possible to obtain a satisfactory processing method that thus requires fewer computing resources.

The method according to the present invention also comprises a step b) of correcting raw measurements $Pix(i,j)$.

Step b) of correcting the raw image comprises in particular computing corrected measurements $Pix_{Cor}(i,j)$ of a corrected image for each bolometer $Bol(i,j)$ on the basis of the reference measurements $Pix_{REF}(i,j)$ and of the result of correlation step a).

In particular, step b) may involve computing the corrected measurements $Pix_{Cor}(i,j)$. This correction of the raw measurements may involve all of the raw measurements $Pix(i,j)$ or only the second raw measurements $Pix_2(i,j)$ representative of the scene. It should be noted that this second alternative remains more advantageous in terms of computing resources.

The corrected measurements $Pix_{Cor}(i,j)$ may be computed by way of the following relationship:

$$Pix_{Cor}(i,j) = Pix(i,j) - \alpha \cdot Pix_{REF}(i,j) - Pix_{offset} \quad \text{[Math 6]}$$

Computing the corrected measurements $Pix_{Cor}(i,j)$ therefore depends on the reference measurements $Pix_{REF}(i,j)$, without requiring any prior correction or calibration thereof. In this respect, FIGS. 4a and 4b illustrate the effect of the correction according to the present invention on an image collected from a scene by the detector 1.

Figure 4A:
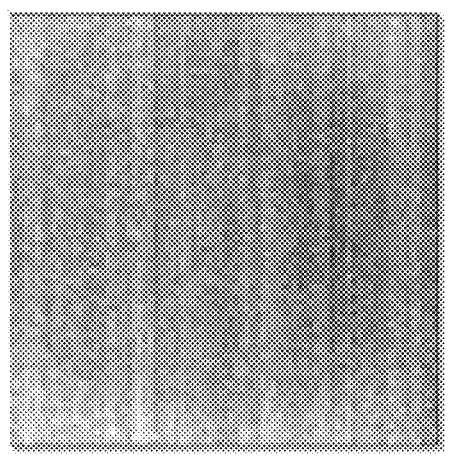
FIG. 4a is a raw image formed by the raw measurements $\text{Pix}(i,j)$ collected by the detector according to the present invention.

In particular, FIG. 4a is a raw image of a scene, representing an individual, collected by the detector 1. The pixelation and column effects however do not allow the individual to be distinguished in this image.

Figure 4B:
FIG. 4b is a corrected image formed by the corrected measurements $\text{Pix}_{Cor}(i,j)$ according to the terms of the present invention.

FIG. 4b, for its part, shows an image corrected in accordance with the terms of the present invention. This image, which no longer exhibits pixelation and a column-like appearance, allows the individual to be distinguished very clearly.

The method according to the present invention thus makes it possible to correct the defects inherent to images formed by way of bolometer detectors. The method according to the present invention makes it possible in particular to correct the pixelation and column effects commonly observed in images formed by way of bolometer detectors.

The method according to the present invention, which exhibits relatively low consumption in terms of computing resources, remains highly robust and efficient. Moreover, this method does not involve any additional mechanical part provided with motorization means, such that its manufacturing and usage cost is thereby reduced. The invention also relates to a computer program that, when it is executed by a computer, leads to the correction method according to the present invention being implemented.

The invention also relates to a device comprising:
  a detector provided with bolometers $Bol(i,j)$ arranged in the form of a matrix-array of n rows ($L_i$) and m columns ($C_j$), the bolometers comprising first $Bol_1(i,j)$ and second $Bol_2(i,j)$ bolometers, the first bolometers $Bol_1(i,j)$ being closed off;
  a computer provided with the computer program according to the present invention.

REFERENCES

[1] EP2940991B1.
[2] US2010237245A1.
[3] EP 3594643A1.

The invention claimed is:

1. A method for processing a raw image characterized by raw measurements $Pix(i,j)$ that comprise first $Pix_1(i,j)$ and second $Pix_2(i,j)$ raw measurements collected, respectively, by first $Bol_1(i,j)$ and second $Bol_2(i,j)$ bolometers of a set of bolometers $Bol(i,j)$ of a detector that are arranged in the form of a matrix-array of n rows ($L_i$) and m columns ($C_j$), the first bolometers $Bol_1(i,j)$ being closed off during the acquisition of the raw measurements $Pix(i,j)$, the method being executed by a computer on the basis of reference measurements $Pix_{REF}(i,j)$ that comprise first $Pix_{1REF}(i,j)$ and second $Pix_{2REF}(i,j)$ reference measurements associated, respectively, with the first $Bol_1(i,j)$ and with the second $Bol_2(i,j)$ bolometers, the reference measurements $Pix_{REF}(i,j)$ being obtained, during a step of calibrating the detector, by masking all of the bolometers with a shutter, the shutter being kept at a reference temperature, the method comprising:
  a) a correlation step comprising a linear regression for each first bolometer $Bol_1(i,j)$, between the first raw measurements $Pix_1(i,j)$ and the first reference measurements $Pix_{1REF}(i,j)$, satisfying the following relationship:

$$Pix_1(i,j) = \alpha \cdot Pix_{1REF}(i,j) + Pix_{offset}$$

where α and $Pix_{offset}$ are the terms determined during the linear regression; and
  b) a step of correcting the raw image, which comprises computing corrected measurements $Pix_{Cor}(i,j)$ of a corrected image for at least each second bolometer $Bol(i,j)$ on the basis of the reference measurements $Pix_{REF}(i, j)$ and of the result of correlation step a).

2. The method according to claim 1, wherein correction step b) comprises computing the corrected measurements $Pix_{Cor}(i,j)$ for at least each second bolometer $Bol(i,j)$ in accordance with the following relationship:

$$Pix_{Cor}(i,j) = Pix(i,j) - \alpha \cdot Pix_{REF}(i,j) - Pix_{offset}.$$

3. The method according to claim 1, wherein the reference measurements $Pix_{REF}(i,j)$ are saved in a memory space of the detector.

4. The method according to claim 1, wherein the detector is provided with a lens mounted on a diaphragm that closes off the first bolometers $Bol_1(i,j)$ at the corners of the detector.

5. The method according to claim 1, wherein the reference temperature is a temperature equal to that of the detector.

6. The method according to claim 5, wherein the reference measurements $Pix_{REF}(i,j)$ are average measurements of the signal actually collected by the bolometers during the calibration step.

7. The method according to claim 1, wherein the detector also comprises blind bolometers $Bol_{blind}(j)$, each blind bolometer $Bol_{blind}(i,j)$ being implemented for the differential measurement of the bolometers of at least one column of bolometers $Bol(i,j)$ that is specific thereto; each blind bolometer $Bol_{blind}(i,j)$ is advantageously associated with a single column ($C_j$) of bolometers ($Bol(i,j)$).

8. A non-transitory computer-readable medium having a computer-executable computer program stored thereon that, when executed by a computer, causes the method according to claim 1 to be implemented.

9. A device comprising:
  a detector provided with bolometers $Bol(i,j)$ arranged in the form of a matrix-array of n rows ($L_i$) and m columns ($C_j$), the bolometers comprising first $Bol_1(i,j)$ and second $Bol_2(i,j)$ bolometers, the first bolometers $Bol_1(i,j)$ being closed off; and
  a computer provided with a computer program that when executed by the computer causes the method according to claim 1 to be implemented.

* * * * *